US006810210B1

(12) United States Patent
Veilleux

(10) Patent No.: US 6,810,210 B1
(45) Date of Patent: Oct. 26, 2004

(54) COMMUNICATION PATH IMPAIRMENT DETECTION FOR DUPLEX OPTIC COMMUNICATION LINK

(75) Inventor: Marc Veilleux, Ottawa (CA)

(73) Assignee: Nortel Networks Limited, St-Laurent (CA)

( * ) Notice: Subject to any disclaimer, the term of this patent is extended or adjusted under 35 U.S.C. 154(b) by 646 days.

(21) Appl. No.: 09/629,624

(22) Filed: Jul. 31, 2000

(51) Int. Cl.[7] .............................................. H04B 10/08
(52) U.S. Cl. ........................ 398/17; 398/20; 398/177; 398/30; 398/31; 398/33; 398/10; 398/11; 398/13; 398/15; 398/16; 398/181; 398/173; 398/18; 398/38
(58) Field of Search .............................. 398/10, 11, 13, 398/15, 30, 31, 17, 177, 181, 173, 16, 18, 20, 33, 38

(56) References Cited

U.S. PATENT DOCUMENTS 5,822,094 A   10/1998  O'Sullivan et al.
6,359,708 B1 *  3/2002  Goel et al. .................. 359/110
6,504,630 B1 *  1/2003  Czarnocha et al. ......... 359/110

* cited by examiner

*Primary Examiner*—Hanh Phan

(57) ABSTRACT

A communication path impairment detection module for connection to a duplex optic communication link is provided. The duplex optic communication link includes an outgoing communication path and an incoming communication path, each being characterized by a data channel and an optical service channel. The communication path impairment detection module includes a first port and a second port suitable for coupling to the outgoing and incoming communication paths respectively. The communication path impairment detection module is responsive to impairment of the data channel and of the optical service channel in the incoming communication path to impair the data channel and the optical service channel in the outgoing communication path.

25 Claims, 7 Drawing Sheets

COMMUNICATION PATH IMPAIRMENT DETECTION FOR DUPLEX OPTIC COMMUNICATION LINK

FIELD OF THE INVENTION

The present invention relates to the field of fiber optics. In particular, this invention relates to a method and system for providing the automatic pre-emption of data transmission when impairment is detected in an associated fiber optic link.

BACKGROUND OF TEE INVENTION

Internet traffic is growing at a rate of approximately 400% a year and it appears that this trend will continue for at least a couple of years. To keep pace with the traffic requirement, high speed, dense electrical and optic fiber links have been deployed.

Optical amplifiers are commonly used in networks including optic fibers to receive, amplify and transmit data signals and control signals in the form of a light beam from a first contact point to a second contact point. The light beam, which is generally produced by a Laser, released by such optical amplifiers typically does not raise safety concerns when the light beam is confined within the optic fiber. However, when light beam is no longer confined to the optic fiber, such as is the case when an optic fiber cut occurs, the intensity of the light bean, released by the optical amplifiers is usually significantly above the acceptable safety levels and may be hazardous.

As a result of the above, methods have been developed for automatically shutting off optical amplifiers when a fiber cut in an optic fiber is detected. A typical approach includes a downstream optical amplifier adapted to monitor an optic fiber carrying an incoming signal to detect a fiber cut. When a fiber cut is detected, the downstream optical amplifier sends a message to the upstream optical amplifier to which it is associated causing the upstream optical amplifier to shut-off all transmissions over the damaged fiber optic link.

A deficiency with methods of the type described above is that the massaging exchange between the upstream and downstream optical amplifiers is frequently complex and introduces a delay between the time a cut in the optic fiber is detected and the time the transmission over the damage optic fiber is pre-empted.

An additional deficiency of methods of the type described above is that in order to re-establish communication over a fiber optic link after a fiber cut has been detected, the optical amplifiers must be periodically turned on and off in order to monitor the state of the fiber optic link in order to detect when the fiber optic link is put back into operation. This results in complex and lengthy reconnection times for the network.

A common method used in the detection of fiber optic cuts is the use of optical reflectometer tools. By applying short laser pulses to a fiber optic link input, the properties of the fiber optic link can he determined on the basis of the light returned to that input by reflection or backscattering within the fiber optic link. Major flaws, such as a cut or pull, in the fiber optic link give rise to substantial reflections producing peaks in the return signal as a function of time. For more information about optical reflectometer tools, the reader is invited to consult U. S. Pat. No. 5,822,094, "Self-Stimulated Signal Detection in an Optical Transmission System", issued to O'Sullivan et al. on Oct. 13, 1998. The contents of this document are hereby incorporated by reference.

Consequently, there is a need in the industry for providing a method and system for automatically pre-empting data transmission over a damaged optic fiber that at least partially alleviates the problems associated with methods and systems of prior art designs.

SUMMARY OF THE INVENTION

In accordance with a broad aspect, the invention provides a method for detecting communication path impairment and a communication path impairment detection module for use in connection with a duplex optic communication link. The duplex optic communication link includes an outgoing communication path and an incoming communication path, where a data channel and an optical service channel characterize each communication path. The communication path impairment detection module includes first and second ports for coupling to the outgoing communication path and the incoming communication path respectively. The communication path impairment detection module also includes a processing un t responsive to impairment of the data channel and of the optical service channel in the incoming communication path to impair the data channel and the optical service channel in the outgoing communication path.

In a very specific example of implementation, a first optic fiber establishes the outgoing communication path and a second optic fiber establishes the incoming communication path.

In an alternative very specific example of implementation, a bi-directional optic fiber establishes the outgoing communication path as well as the incoming communication path.

For the purpose of this specification, the expression outgoing communication path is used to designate a communication path that carries outgoing data and control signals from a given communication path impairment detection module. For the purpose of this specification, the expression incoming communication path is used to designate a communication path that carries incoming data and control signals to a given communication path impairment detection module.

Advantageously, by correlating the detection of impairment of the data channel and impairment of the optical service channel carried over a same optic fiber to initiate the impairment of the data channel and impairment of the optical service channel in the outgoing communication path, an improved likelihood of correct impairment detection is obtained. In other words, if both the optical service channel and the data channel are impaired and are both carried by the same optic fiber, there is a high likelihood that the impairment is due to the optic fiber.

In a non-limiting example of implementation, the processing unit is adapted to detect impairment of the data channel and the optical service channel in the incoming communication path. The processing unit disables transmission over the data channel of the outgoing communication path and impairs the optical service channel when the impairment of the data channel and of the optical service channel in the incoming communication path is detected.

More specifically, when the impairment of the optical service channel in the incoming communication path is characterized by either one of a low light intensity and an absence of light, the processing unit is operative for impairing the optical service channel in the outgoing communication path by including the transmission of a control data element of a first type in the outgoing communication path. The control data element of the first type conveys an impairment status associated to the optical service channel in the incoming communication path.

When the impairment, of the optical service channel in the incoming communication path is characterized by a presence of a control data element conveying an impairment status associated to the optical service channel and the data channel in the outgoing communication path, the processing unit is operative for impairing the optical service channel in the outgoing communications path by transmitting a control data element of a second type over the optical service channel in the outgoing communication path. The control-data element of the second type conveys a non-impairment status associated to the optical service channel in the incoming communication path.

Continuing the specific example, the processing unit is also operative for re-establishing transmission over the data channel in an outgoing communication path that was previously impaired. Transmission is re-established ,when absence of either one of impairment of the data channel and impairment of the optical service channel in the incoming communication path is detected.

In a non-limiting example, the communication path impairment detection module is a part of an optical amplifier.

In accordance with another broad aspect, the invention provides a communication system including communication path impairment detection modules of the type described above.

Other aspects and features of the present invention will become apparent to those ordinarily skilled in the art upon review of the following description of specific embodiments of the invention in conjunction with the accompanying figures.

DETAILED DESCRIPTION

Figure 1:
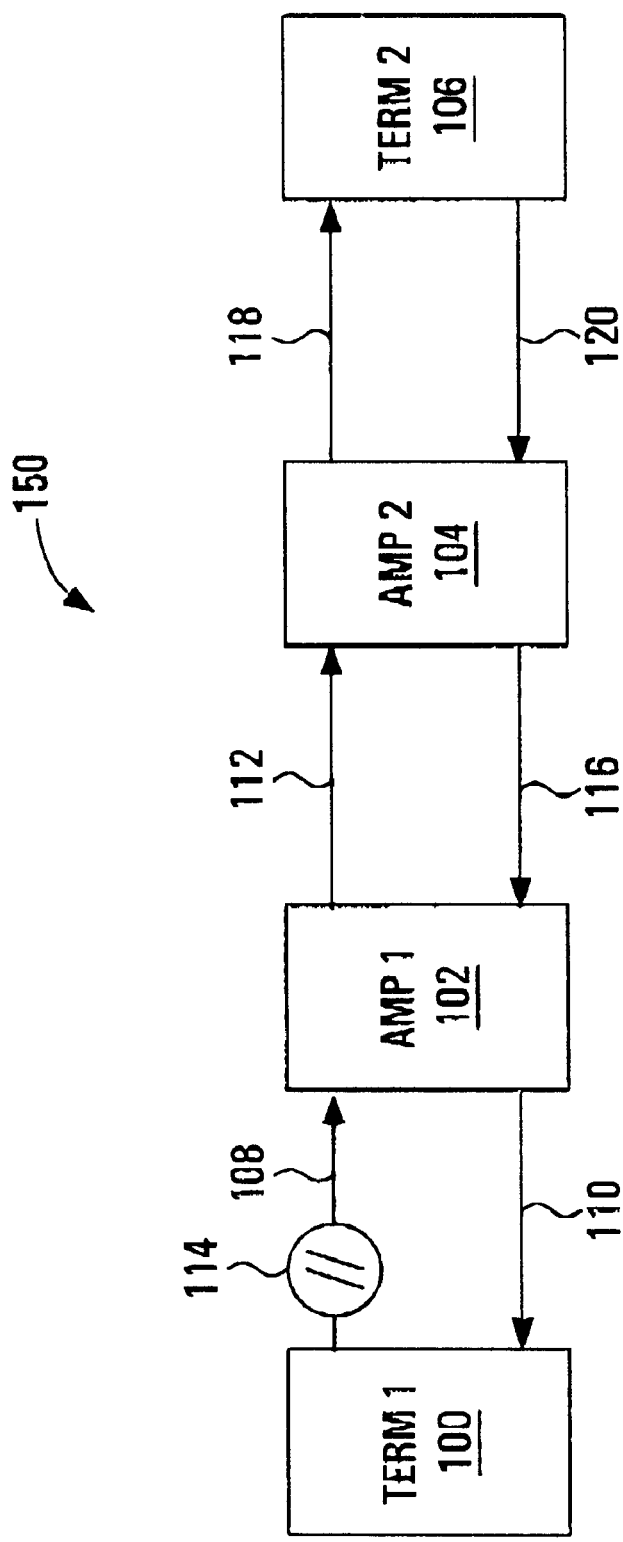
FIG. 1 is a block diagram of a communication system including communication path impairment detection modules in accordance with the spirit of the invention.

FIG. 1 illustrates a communication system 150 including communication path impairment detection modules embodied in optical amplifiers 100 102 104 106 constructed in accordance with the present invention. The communication system 150 includes a first terminal optical amplifier unit 100, a second terminal optical amplifier unit 106, a first line amplifier unit 102 and a second line amplifier unit 104. The first terminal optical amplifier unit 100 communicates with the second terminal optical amplifier unit 106 through the first and second line amplifier units 102 104. The first and second terminal optical amplifiers 100 106 transmit from and receive signals at terminals or regenerator entities in a communication network. These first terminal optical amplifiers include the first amplifiers in the optical transport layer.

The terminal and line amplifiers communicate with one another through duplex optic communication links each including an outgoing communication path and an incoming communication path. The specific example presented herein below describes a duplex communication link having first and second optic fibers establishing outgoing and incoming communication paths respectively. However it is to be expressly understood that one bi-directional optic fiber establishing the incoming communication path as well as the outgoing communication path can be used in lieu of the first and second optic fibers without detracting from the spirit of the invention.

The first terminal optical amplifier unit 100 is connected to the first line amplifier unit 102 through a first duplex optic communication link including first and second optic fibers 108 110. The first optic fiber 108 establishes an outgoing communication path from the first terminal optical amplifier unit 100 to the first line amplifier unit 102 and the second optic fiber 110 establishes an incoming communication path from the first line amplifier unit 102 to the first terminal optical amplifier 100. The reader will readily appreciate that the expressions outgoing communication path and incoming communication path depend on the reference point being considered. For example, from the perspective of the first terminal optical amplifier unit 100, the outgoing communication path is embodied in optic fiber 108 and the incoming communication path is embodied in optic fiber 110. Similarly, from the perspective of the first line amplifier unit 102, the outgoing communication path is embodied in optic fiber 110 and the incoming communication path is embodied in optic fiber 108. Each of the outgoing and incoming communication paths is characterized by a data channel and an optical service channel. The data channel in either communication path is for carrying information data elements while the optical service channel is for carrying control information. The optical intensity of the data channel is significantly greater than :hat of the optical service channel as the former frequently comprises a plurality of wavelengths, each wavelength being about 0–5 dBm. In contrast, the optical service channel frequently includes one wavelength of the order of 0 dBm For example, a typical optic fiber carries 40 wavelengths resulting in a data channel of the order to 21 dBm while the optical service channel is of the order of about 0 dBm.

The first line amplifier unit 102 is connected to the second line amplifier unit 104 through a second duplex optic communication link including optic fibers 112 and 116 and the second line amplifier unit 104 is connected to the second terminal optical amplifier unit through a third duplex optic communication link including optic fibers 118 and 120. The second and third duplex optic communication links are similar in structure to the First duplex optic communication link. The reader will readily appreciate that the communication system may include additional line amplifier units without detracting from the spirit of the invention, each line amplifier unit being; coupled to other line amplifier units through duplex optic communication links. Moreover, the communication system may include no line amplifier units on the terminal optical amplifier units coupled to one another directly through a duplex optic communication link.

The first and second line amplifier:; 102 104 are each operative to transmit from and receive signals between two terminal optical amplifier units, between a terminal optical amplifier unit and another line amplifier or alternatively between two line amplifiers. The first and second line amplifiers 102 104 each provide Communication path impairment detection functionality to two duplex optic communication links, each of the duplex optic communication links including first and second optic fibers establishing an outgoing communication path and an incoming communication path respectively.

Figure 2:
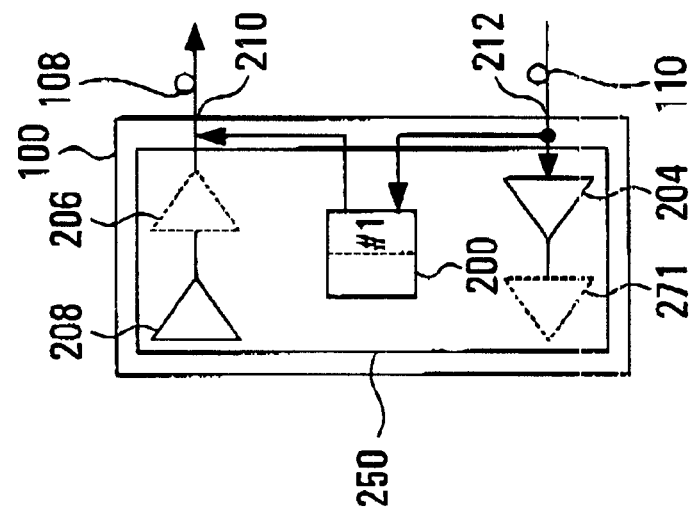
FIG. 2 is a block diagram of a specific example of implementation of a communication path impairment detection module suitable for use at a terminal end of a communication network.

The first terminal optical amplifier unit 100 will be best understood in connection with FIG. 2 of the drawings. The second terminal optical amplifier unit 106 is similar in structure to the first terminal optical amplifier unit 100 and therefore will not be separately described. As depicted, be first terminal optical amplifier unit 100 includes a first port 212 suitable for coupling to optic fiber 110, a second port 210 suitable for coupling to optic fiber 108 and a processing unit 250. The first port 212 is suitable for receiving data elements over the data channel and control data elements over an optical service channel, each channel being carried by optic fiber 110. The second port 210 is suitable for transmitting data elements over the data channel and control data elements over an optical service channel over optic fiber 108.

The processing unit 250 is operatively coupled to the first port 212 and to the second port 21C. The processing unit is responsive to impairment of the data channel and of the optical service channel received at the first port 212 to impair the data channel and the optical service channel at the second port 210. More specifically, the processing unit 250 monitors the first port 212 to derect impairment of the data channel and impairment of the optical service channel. When impairment of both the data channel and the optical service channel is detected, the processing unit is operative to impair the data channel and the optical service channel at the second port 210.

The impairment of the data channel incoming at first port 212 is detected by identifying either one of a low light intensity and an absence of light in the data channel. For instance this may be implemented by providing an optical power computing unit operative for computing an optical power value corresponding to the signal received at the first port 212 over the data channel. The computed optical power value can then be compared to a reference optical power value. If the computed optical power value falls below the reference optical power value, impairment of the data channel is detected. Computing the optical power of a channel in an optic fiber is well-krown in the art to which this invention pertains and consequently will not be described further here. Other suitable impairments detection methods may be used without detracting from the spirit of the invention.

In a specific example of implementation, the impairment of the optical service channel incoming at first port 212 is detected by identifying either one of two forms of impairment namely a physically originating impairment and a logically originating impairment. A physically originating impairment is an impairment resulting from a cut of the optic fiber, a disconnected connection in the optic fiber or any other condition that physically prevents the optic fiber from adequately transmitting signals. This form of impairment is characterized by either one of a low light intensity and an absence of light in the optical service channel incoming at first port 212. The detection of these conditions can be done in the same fashion as that described above in connection with the data channel.

A logically originating impairment is characterized by the presence of a control data element of a first type in the optical service channel received at the first port 212, The control data element of the first type conveys a status of impairment associated to the optical service channel in the path defined by optic fiber 108.

In the specific example of implementation depicted in FIG. 2, the processing unit 250 includes an amplifier module pair including amplifier modules 204 and 206 operatively coupled to one another and to the first port 212. The amplifier module 204 is operative to process the data signal received at the first port 212 in order to derive an amplified version of the signal. In a very specific example, the amplifier module 204 is of a low noise pre-amplifier type. The output of the amplifier module 204 is coupled to amplifier module 271. In a very specific example, the amplifier module 271 is of a booster type. The amplifier module 204 is also operative to monitor the first port 212 to detect an impairment condition associated to the data channel. More specifically, the amplifier module 204 is operative for deriving an optical power value indicative of the optical power associated to the data channel received at first port 212. If the optical power value indicates that the incoming data channel is characterized by either one of a low light intensity or an absence of light, the incoming data channel is considered to be impaired. In a very specific example, this is effected by comparing the optical power value of the data channel received at the first port 212 to a reference value. If the optical power indicator falls below the reference value, the data channel is determined to be impaired. The output of the amplifier module 204 is coupled to amplifier module 271. The skilled person in the art will readily appreciate that although the amplifier modules 204 and 271 are shown as separate entities in the figure, a single amplifier module having the same functionality as the combination of amplifier modules 204 and 271 may be used instead.

The processing unit 250 also includes an optical service channel monitoring unit 200 operatively coupled to the first port 212 and to the first amplifier module 204. The optical service channel monitoring unit 200 is operative to periodically generate and transmit over the optical service channel of the outgoing communication path sets of control signals. In particular, the set of control signals includes at least one component indicative of a status of non-impairment associated to the incoming Communication path defined by optic fiber 110. The optical service channel monitoring unit 200 is also operative to process the control signals in the optical service channel received at the first port 212. In particular, the optical service channel monitoring unit 200 is operative to monitor the first port 212 to detect an impairment condition associated to the incoming optical service channel. If impairment is detected, the form of impairment, namely physically originating impairment or logically originating impairment, is also determined. If no impairment or a logically originating impairment is detected, the optical service channel monitoring unit 200 continues transmitting the component indicative of a status of non-impairment associated to the incoming communication path defined by optic fiber 110. If a physically origirating impairment is detected, the optical service channel monitoring unit 200 pre-empts the transmission of the component indicative of a status of non-impairment and begins transmitting a component indicative of a status of impairment associated to the incoming communication path defined by optic fiber 110.

The amplifier module 206 is operatively coupled to the second port 210, to the amplifier module 208, to the first amplifier module 204 and to the optical service channel monitoring unit 200. The amplifier module 206 is operative to process a data signal received from amplifier module 208 in order to derive an amplified version of that data signal. In a very specific example, the amplifier module 208 is of a low noise pre-amplifier type and the amplifier module 206 is of a booster type. The second amplifier module 206 is operative to monitor the first amplifier module 204 to detect an impairment condition associated to the data channel. The second amplifier module 206 is operative to monitor the optical service channel monitoring unit 200 to receive an indicator of the impairment condition associated to the optical service channel. The second amplifier module 206 is adapted to cease transmission at the second port over the data channel when impairment of the data channel and of the optical service channel is detected. As was the case for amplifier modules 204 and 271, although the amplifier modules 208 and 206 are shown as separate entities in the figure, a single amplifier module having the same functionality as the combination of amplifier modules 208 and 206 may be used instead.

Figure 3:
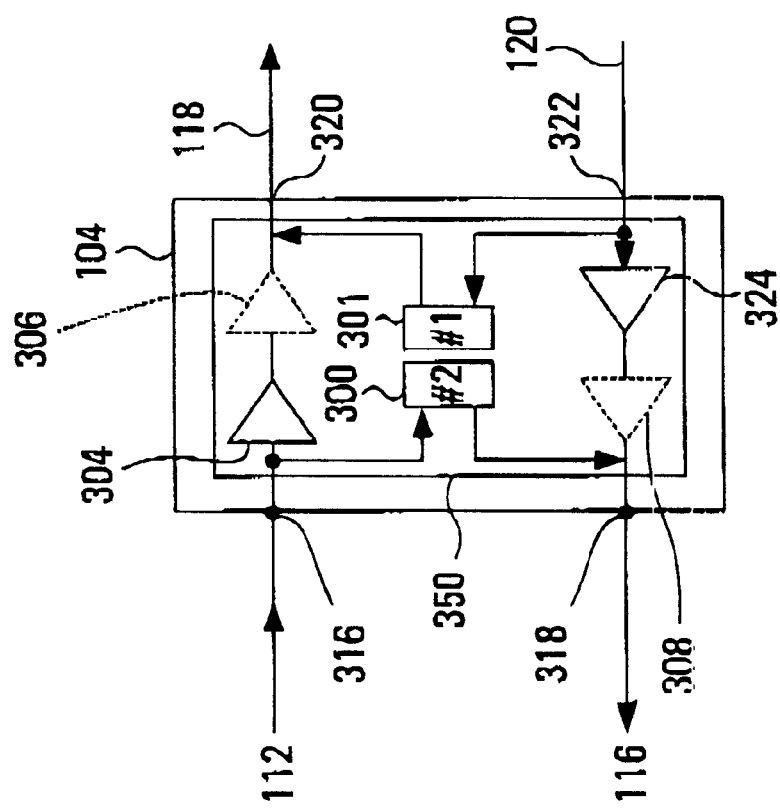
FIG. 3 is a block diagram of a specific example of implementation of a communication path impairment detection module suitable for use between two duplex optic communication links of a communication network.

The second line amplifier unit 104 will be best understood in connection with FIG. 3 of the drawings. The first line amplifier unit 102 is similar in structure and functionality to the second line amplifier unit 104 and will not be separately described. As depicted, the second line amplifier unit 104 includes four ports namely a first port 316 suitable for coupling to optic fiber 112, a second port 318 suitable for coupling to optic fiber 116, a third port 320 suitable for coupling to optic fiber 118, a fourth port 322 suitable for coupling to optic fiber 120 and a processing unit 350. The first port 316 and the fourth port 322 are similar in structure and functionality to one another and to port 212 described in connection with the first terminal amplifier unit 100. The second port 318 and the third port 320 are similar in structure and functionality to one another and to port 210 described in connection with the first terminal amplifier unit 100.

The processing unit 350 is operatively coupled to the first, second, third and fourth ports 316 318 320 322. The processing unit 350 is responsive to impairment of the data channel and of the optical service channel received at the first port 316 to impair the data channel and the optical service channel at the second port 318. Similarly, the processing unit 350 is responsive to impairment of the data channel and of the optical service channel received at the fourth port 322 to impair the data channel and the optical service channel at the third port 320. The detection of the impairment at the first and fourth ports 316 322 and the impairment at the third and second ports 320 318 is effected in substantially the same fashion as that described in connecting with the detection of the impairment at the first port 212 and the impairment or the second port 210 described in connection with FIG. 2.

In the specific example of implementation depicted in FIG. 3, the processing unit 350 includes two amplifier module pairs namely a first amplifier module pair including amplifier modules 304 and 308 and a second amplifier module pair including amplifier modules 324 and 306. Each amplifier module pair is functionally equivalent to the amplifier module pair including amplifier modules 204 and 206 described previously. As was the case for amplifier modules 204 and 271, although the amplifier modules 304 and 306 are shown as separate entities in the figure, a single amplifier module having the same functionality as the combination of amplifier modules 304 306 may be used instead. The same is applicable to amplifier modules 324 and 308. The processing unit 350 also includes two optical service channel monitoring units 300 and 301 functionally equivalent to the optical service channel monitoring unit 200 described in connection with FIG. 2.

Figure 4A:
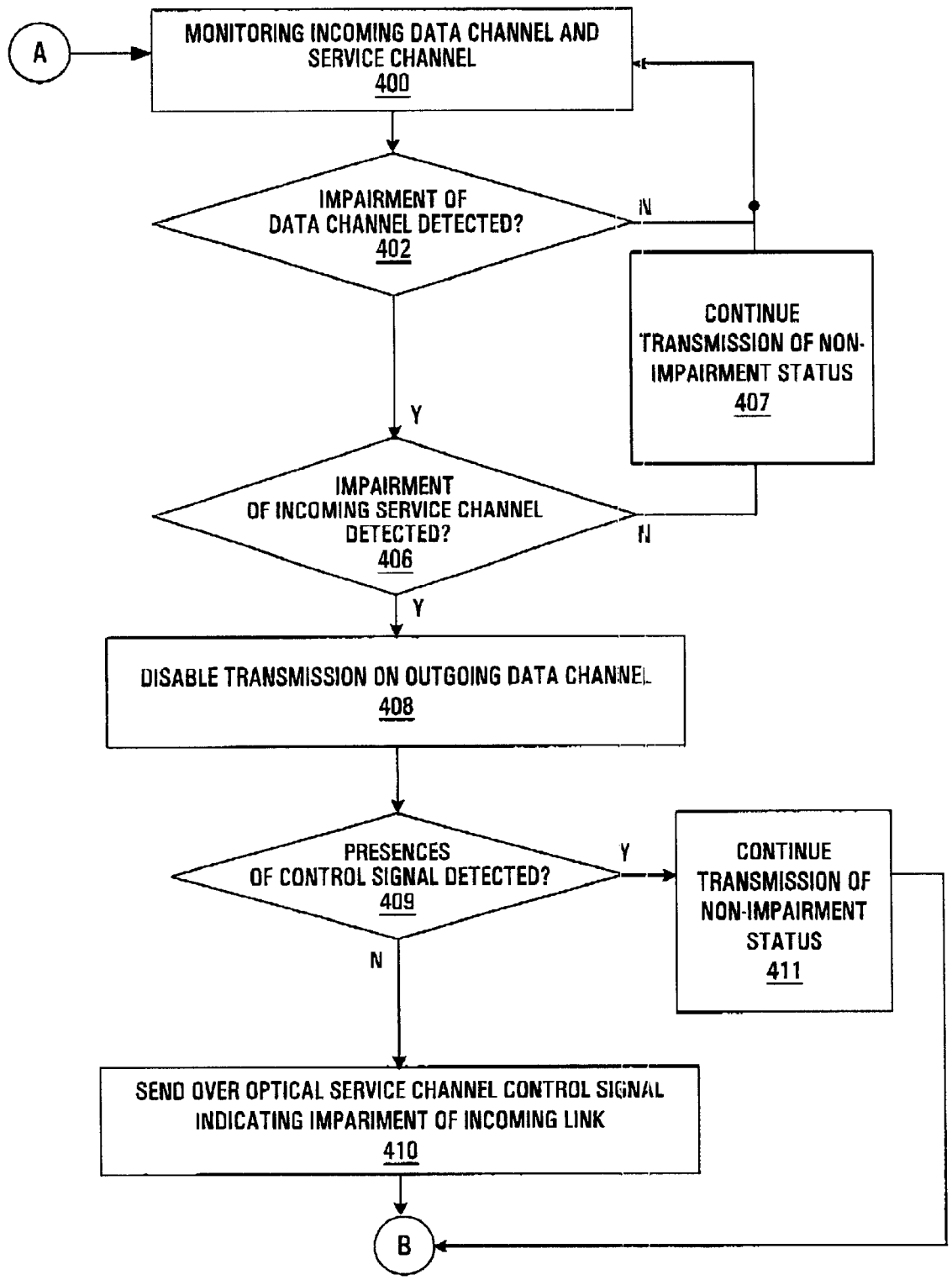
FIGS. 4a and 4b are flow diagrams of a process making use of communication path impairment detection modules for automatically impairing outgoing data arid optical service channels in accordance with the spirit of the invention.
Figure 4B:
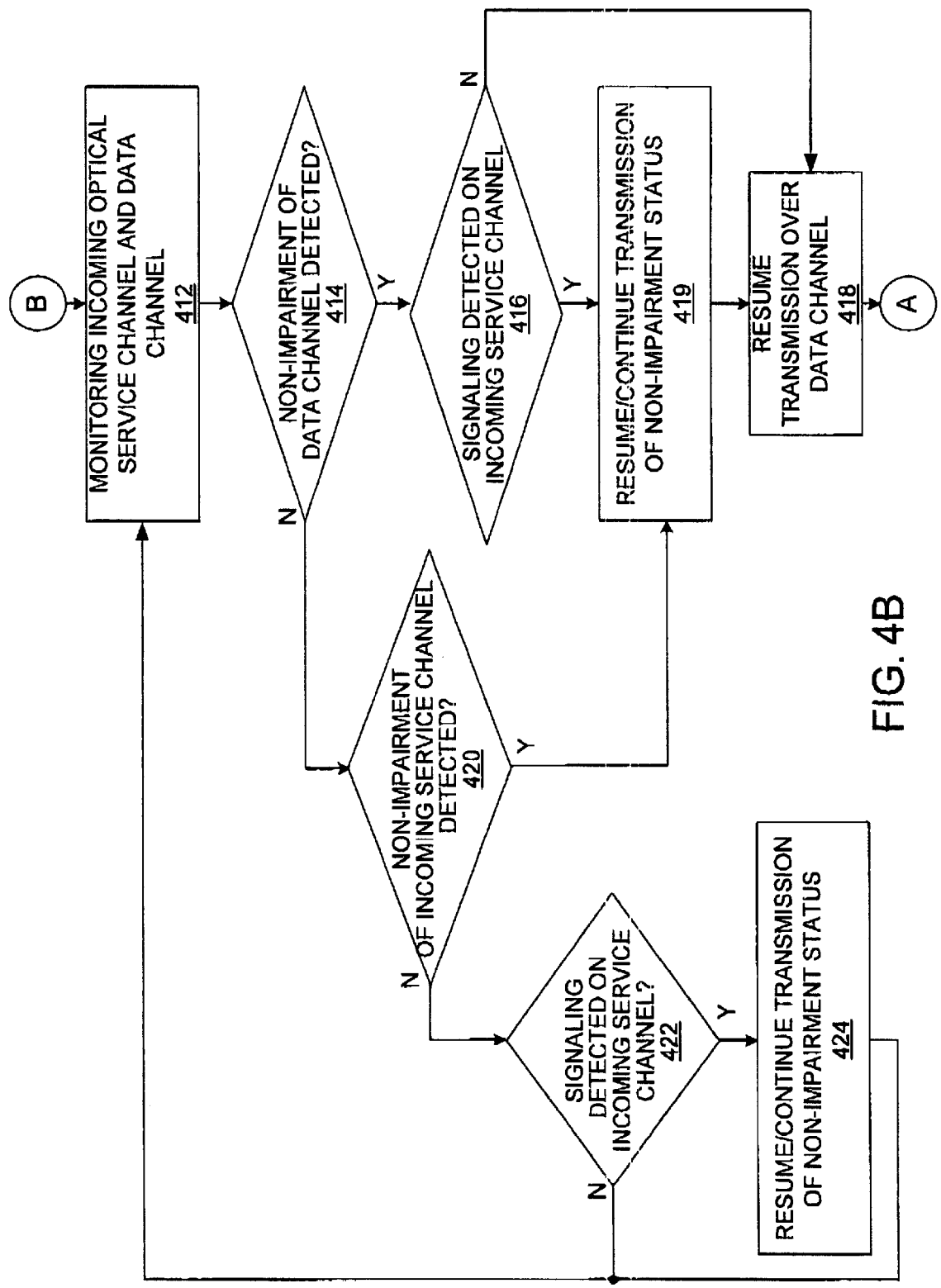

A typical interaction will better illustrate the functioning of the terminal optical amplifier unit 100. In operation, as depicted in FIGS. 4a and 4b, the terminal optical amplifier unit 100 transmits over the outgoing communication path defined by optic fiber 108 control signals over the optical service channel and data signals over the data channel. The control signals include at least one component indicative of a status of non-impairment associated to the incoming communication path defined by optic fiber 110. The control signals End the data signals are transmitted continuously over the outgoing communication path until a concurrent impairment condition of the incoming data channel and optical service channel is detected.

Concurrently with the transmission of the control signals and the data signals, at step 400, the incoming data channel and the incoming service channel received at first port 212 are monitored by the processing unit 250. At step 402, if impairment of the incoming data channel is not detected, the processing unit 250 returns to step 400. If impairment of the incoming data channel is detected, at step 406 the processing unit determines whether impairment of the incoming optical service channel is also detected. In the negative, the processing unit 250 continues transmission of a control data element indicative of a non-impairment status 407 and returns to step 400. If impairment of the incoming optical service channel is detected, the Processing unit 250 disables the transmission of data signals on the outgoing data channel at step 408. At step 409, the processing unit determines whether the impairment of the incoming optical service channel was a physically originating impairment or a logically originating impairment. If the impairment is a physically originating impairment, the processing unit 250 proceeds to step 410 and replaces in the control signals the component indicative of a status of non-impairment by a component indicative of a status of impairment associated to the incoming communication path defined by optic fiber 110. If the impairment is a logically originating impairment, condition 409 is answered in the positive and at step 411 transmission of the control signals including the component indicative of a status of non-impairment is continued.

Step 412, depicted in FIG. 4b, follows either one of steps 410 and 411. At step 412, the processing unit monitors the incoming optical service channel and the data channel. At step 414 if non-impairment of the data channel is detected condition 416 is tested to determine whether signaling is detected on the optical service channel. In the affirmative, at step 419 the transmission of the component indicative of a status of non-impairment is resumed (or is continued) by the processing unit. Following step 419 or if condition 416 is answered in the negative, at step 418 the processing unit resumes transmission over the data channel and then returns to step 400. If at step 414, the condition is answered in the negative condition 420 is evaluated to determine whether the non-impairment of the incoming optical service channel is detected. In the affirmative, the processing unit proceeds to step 419. In the negative, condition 422 is tested to determine whether any signaling was detected on the incoming optical service channel. In the affirmative, the processing unit resumes (or continues) the transmission of the component indicative of a status of non-impairment and then returns to step 412. IS condition 422 is answered in the negative, step 424 is omitted and the system return to step 412.

Advantageously, by allowing the optical service channel to remain in operation irrespective of the impairment of the communication path, the duplex optic communication link can be put back into operation as soon as a physically originating impairment is remedied. The operation of the optical service channel during an optic fiber cut does not raise a safety concern provided the optic power of the optic service channel is below a safe level.

Additional examples will further illustrate the behavior of the communication path impairment detection modules embedded in the terminal and line amplifiers of FIG. 1.

For the purpose of this first example let us consider the duplex communication link including optic fibers 108 and 110. During normal operation (i.e. in the absence of impairment of the optic fibers) the first terminal optical amplifier unit 100 sends data and control information to the first line amplifier over optic fiber 108. Similarly, the first line amplifier 102 sends data and control information to the first terminal optical amplifier unit 100 over optic fibers 110. The control information sent in both directions includes a component indicative of a status of non-impairment associated to the incoming communication path defined by optic fibers 110 and 108 respectively. When a fiber cut, identified by reference numeral 114, occurs on optic fiber 108, the first line amplifier 102 will detect impairment of both the data channel and the optical service channel in the incoming communication path defined by optic fiber 108. Consequently, the first line amplifier 102 will impair the data channel in its outgoing communication path defined by optic fiber 110. In a specific example, the first line amplifier 102 impairs the data channel by ceasing transmission over the outgoing data channel. In addition, since the impairment of the optical service channel in the incoming communication path was a physically originating impairment (the cut in the optic fiber 108), the first line amplifier 102 will cease transmitting a component indicative of a status of non-impairment associated to the incoming communication path defined by optic fibers 108 and begin transmitting a component indicative of a status of impairment associated to the incoming communication path defined by optic fibers 108. The first line amplifier 102 will remain in this state until non-impairment of either one of the data channel and the optical service channel in the incoming service channel is detected.

Following this, at the first terminal optical amplifier unit 100, the impairment of the data channel and the optical service channel in the incoming communication path defined by optic fiber 110 is detected. Consequently, the first terminal amplifier 100 will impair the data channel in the outgoing communication path. In a specific example, the terminal amplifier 100 impairs the data channel by ceasing transmission over the outgoing data channel. In addition, since the impairment of the optical service channel in the incoming communication path, defined by optic fiber 110, was a logically originating impairment (he presence of a component indicative of impairment), the first terminal amplifier 100 will continue transmitting a component indicative of a status of non-impairment associated to the incoming communication path defined by optic fibers 110. The first terminal amplifier 100 will remain in this state until non-impairment of either one of the data channel and the optical service channel in the incoming communication path is detected.

When the fiber cut 114 is repaired, the first line amplifier 102 will begin receiving signaling on the optical service channel including the component indicative of a status of non-impairment associated to the incoming communication path defined by optic fibers 110. Since the optical service channel is no longer considered to be impaired, the first line amplifier 102 will resume transmission on the outgoing data channel. In addition, the first line amplifier 102 will resume transmission of a component indicative of a status of non-impairment associated to the incoming communication path defined by optic fiber 108 and cease transmission of the status of impairment. Following this, at the first terminal optical amplifier unit 100, impairment of either the data channel or the optical service channel is no longer being detected. Consequently, the first terminal amplifier unit 100 resumes the transmission over the data channel in the outgoing communication path defined by optic fiber 108.

Figure 5A:
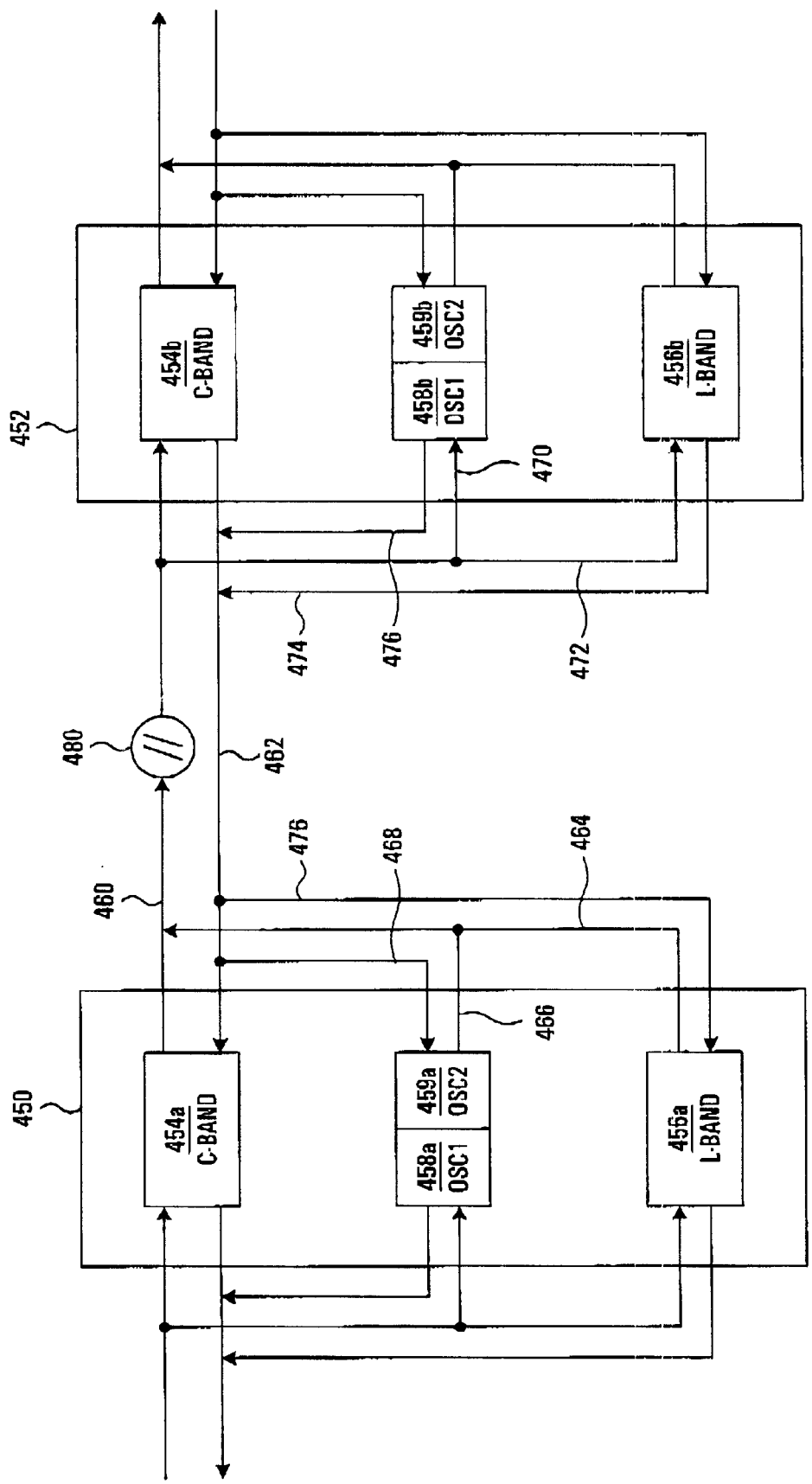
FIGS. 5A and 5B are block diagrams of a communication network segment including separate processing units for each of the C-band traffic and the L-band traffic in accordance with a variant of the invention.
Figure 5B:
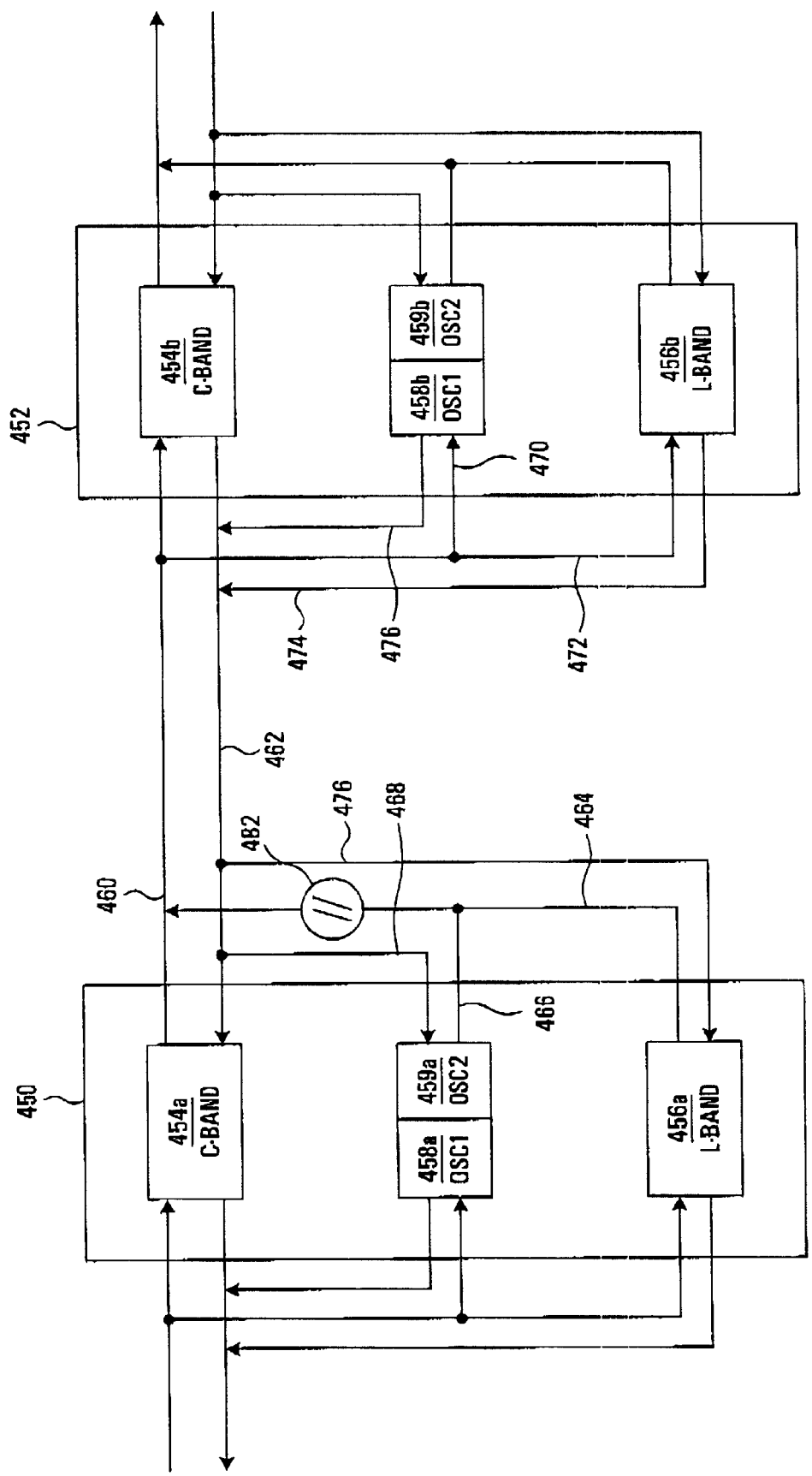

As a variant, traffic occurring on different bands is treated separately by the communication path impairment detection modules. FIGS. 5a and 5b show a first line amplifier module 450 coupled to a second line amplifier module 452. Modules 450 and 452 are substantially equivalent to one another. Consequently, for the sake of simplicity, functionally equivalent units have been given like numerals followed by the suffix "a" for module 450 and "b" for module 452. Each line amplifier module comprises two optical service channel monitoring units 458 459, a C-band traffic (conventional-band) unit 454 and an L-band traffic (long-band) unit 456.

The optical service channel monitoring units 458 459 are each functionally equivalent to the optical service channel monitoring units 300 and 301 described in connection with FIG. 3.

Figure 5C:
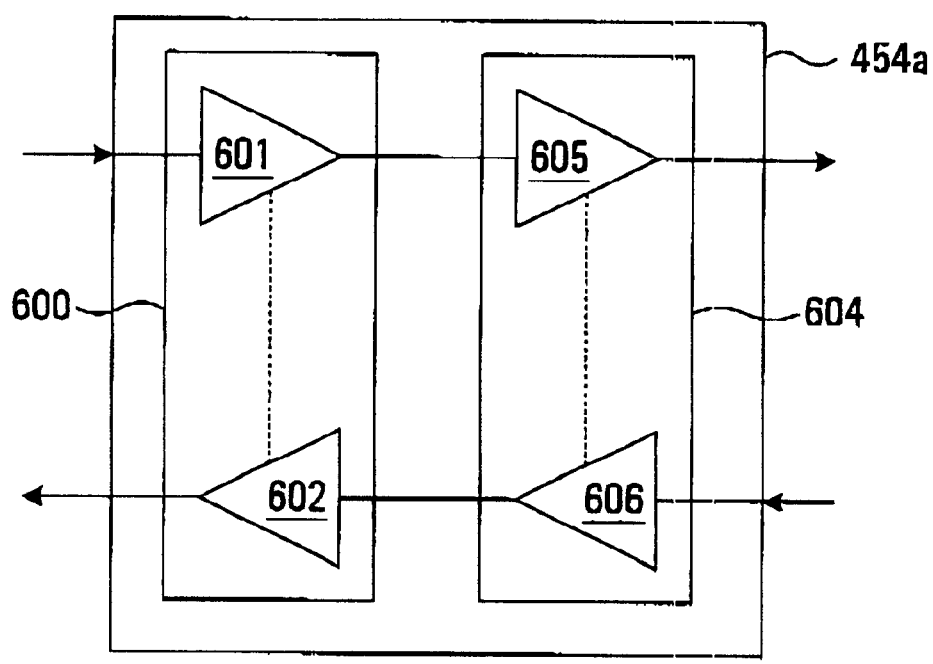
FIG. 5C is a simplified block diagram of a C-band traffic unit in accordance with a very specific example.

The C-band traffic (conventional-band) unit 454 is adapted to receive, amplify and transmit C-band traffic and is shown in greater detail in FIG. 5c. Two amplifier module pairs are provided, namely a first amplifier module pair 600 including amplifier modules 601 602 and a second amplifier module pair 604 including amplifier modules 605 606. Each amplifier module pair is functionally equivalent to the amplifier module pair including amplifier modules 204 and 206 described previously.

The L-band traffic (long-band) unit 456 is adapted to receive, amplify and transmit L-band traffic and is functionally equivalent to the amplifier module pair including amplifier modules 204 and 206 described previously.

Examples will illustrate the behavior of the communication path impairment detection modules embedded in line amplifiers of FIGS. 5a and 5b.

For the purpose of this first example let us consider the duplex communication link including optic fibers 460 and 462, During normal operation (i.e. in the absence of impairment of the optic fibers) the first line amplifier unit 450 sends data (over the C-band and L-band) and control information to the second line amplifiers 452 over optic fiber 460. Similarly, the second line amplifier 452 sends data and control information to the first line amplifier unit 450 over optic fiber 462. The control information sent in both directions includes a component indicative of a status of non-impairment associated to the incoming communication paths defined by optic fibers 460 and 462 respectively.

In a first scenario, as depicted in figure 5a, when a fiber cut 480 occurs on optic fiber 460, the second line amplifier 452 will detect impairment of the C-band data channel, the L-band data channel, as well as impairment of the optical service channel in the incoming communication path. Consequently, the second line amplifier 452 will impair the C-band data channel, the L-hand data channel in its outgoing communication path. In a specific example, the second line amplifier 452 impairs the C-band data channel and the L-band data channel by ceasing transmission over the outgoing C-band data channel and the outgoing L-band data channel. In addition, since the impairment of the optical service channel in the incoming communication path was a physically originating impairment (the cut in the fiber), the second line amplifier 452 will cease transmitting a component indicative of a status of non-impairment associated to the incoming communication path defined by optic fiber 460 and begin transmitting a component indicative of a status of impairment associated to the incoming communication path defined by optic fiber 460. The second line amplifier 452 will remain in this state until non-impairment of either one of the C-band data channel, the L-band data channel and the optical service channel in the incoming communication path is detected.

Following this, at the first line amplifier unit 450, the impairment of the C-band data channel, of the L-band data channel and of the optical service channel in the incoming communication path defined by optic fiber 462 is detected. Consequently, the first line amplifier 450 will impair the C-band data channel and the L-band data channel in the outgoing communication path. In a specific example, the first line amplifier 450 impairs the C-band data channel and the L-band data channel by ceasing transmission over the outgoing C-band data channel and the outgoing L-band data channel. Tn addition, since the impairment of the optical service channel in the incoming communication path was a logically originating impairment (the presence of a component indicative of impairment) the first line amplifier 450 will continue transmitting a component indicative of a status of non-impairment associated to the incoming communication path defined by optic fiber 462. The first line amplifier 450 will remain in this state until non-impairment of either one of the C-band data channel, the L-band data channel and the optical service channel in the incoming communication path is detected.

When the fiber cut 480 is repaired, the first line amplifier 450 and the second line amplifier 452 will resume operation in the same fashion as that described previously in connection with FIG. 1.

In a second scenario, as depicted in FIG. 5b, when a fiber cut 482 occurs in optic fiber 464 thereby causing impairment of the L-band traffic and of the optical service channel outgoing from the first line amplifier 450. The L-band traffic unit 456b of the second line amplifier 452 will detect impairment of the L-band data channel and the optical service channel monitoring unit 458b will detect impairment of the optical service channel incoming at optical line amplifier unit 452 Consequently, the second line amplifier 452 will impair the L-band data channel and the optical service channel in the outgoing communication path defined by optic fiber 462. In a specific example, the second line amplifier 452 impairs the L-band data channel by ceasing transmission over the outgoing L-band data channel. In addition, since the impairment of the optical service channel in the incoming communication path was a physically originating impairment (the cut 482 in the optic fiber 464), the second line amplifier 452 will cease transmitting a component indicative of a status of non-impairment and begin transmitting a component indicative of a status of impairment. The C-band traffic unit 454b of the second line amplifier 452 will detect non-impairment of the C-band data channel incoming at optical line amplifier unit 452. Consequently, the second line amplifier 452 will maintain normal operation of the C-band data channel in outgoing communication path. The second line amplifier 452 will remain in this state until non-impairment of either one of the L-band data channel and of the optical service channel is detected.

Following this, at the first line amplifier unit 450, the impairment of the L-band data channel and the optical service channel in the incoming communication path defined by optic fiber 462 is detected. Consequently, the first line amplifier 450 will impair the L-band data channel and the optical service channel in the outgoing communication path. In a specific example, the first line amplifier 450 impairs the L-band data channel by ceasing transmission over the outgoing L-band data channel. In addition, since the impairment of the optical service channel in the incoming communication path was a logically originating impairment (the presence of a component indicative or impairment), the first line amplifier 450 will continue transmitting a component indicative of a status of non-impairment. The first line amplifier 450 will remain in this state until non-impairment of either one of the L-band data channel and the optical service channel in the incoming communication path is detected.

When the fiber cut 482 is repaired, the first line amplifier 450 and the second line amplifier will resume operation in the same fashion as that described previously in connection with FIG. 1.

The communication path impairment detection module described above can be implemented in software or hardware. A hardware implementation is more common and can be carried out on signal processors of a type well known to those skilled in the art.

Although the present invention has been described in considerable detail with reference to certain preferred embodiments thereof, variations and refinements are possible without departing from the spirit of the invention. Therefore, only the appended claims and their equivalents should limit the scope of the invention.

What is claimed is:

1. A communication path impairment detection module for connection to a duplex optic communication link, the duplex optic communication link including an outgoing communication path and an incoming communication path, each communication path being characterized by a data channel and an optical service channel, said communication path impairment detection module comprising:
   a) a first port suitable for communicating with the outgoing communication path;
   b) a second port suitable for communicating with the incoming communication path;
   c) a processing unit coupled to said first pot and to said second port, said processing unit being responsive to impairment of the data channel and the optical service channel in the incoming communication path to:
   i. impair the data channel in the outgoing communication path; and
   ii. transmit a control data element indicative of a non-impairment status in the optical service channel in the outgoing communication path when the impairment of the optical service channel in the incoming communication path is of a first impairment type; and
   iii. transmit a control data element indicative of an impairment status over the optical service channel in the outgoing communication path when the impairment of the optical serve channel in the incoming communication path is of a second Impairment type, the second impairment type being different from the first impairment type.

2. A communication path impairment detection module as defined in claim 1, wherein said processing unit is adapted to detect impairment of the data channel and the optical service channel in the incoming communication path.

3. A communication path impairment detection module as defined in claim 2, wherein impairment of the data channel in the incoming communication path is characterized by either one of a low light intensity and an absence of light in the data channel.

4. A communication path impairment detection module as defined in claim 3, wherein impairment of the data channel in the outgoing communication path is characterized by either one of a low light intensity and an absence of light in the data channel.

5. A communication path impairment detection module as defined in claim 3, wherein when impairment of the optical service channel in the incoming communication channel is of a second impairment type, impairment of the optical service channel in the incoming communication path is characterized by either one of a low light intensity and an absence of light in the optical service channel in the incoming communication path.

6. A communication path impairment detection module as defined in claim 3, wherein when impairment of the optical service channel in the incoming communication channel is of a first impairment type, impairment of the optical service channel in the incoming communication path is characterized by a presence of a control data element in the optical service channel in the incoming communication path conveying an impairment status associated to the optical service channel in the outgoing communication path.

7. A communication path impairment detection module as defined in claim 3, wherein said processing unit is further operative for:
   i. deriving an optical power indicator indicative of an optical power condition associated to the data channel in the incoming, communication path;
   ii. deriving an optical service channel indicator indicative of an optical service channel condition associated to the optical service channel in the incoming communication path;
   iii. disabling transmission over the data channel of the outgoing communication path when the optical service channel indicator and the optical power condition indicator are indicative of impairment of the data channel and impairment of the optical service channel in the incoming communication path.

8. A communication path impairment detection module as defined in claim 7, wherein said processing unit is further operative for re-establishing transmission over the data channel in the outgoing communication path that was previously impaired when absence is detected of either one of impairment of the data channel and impairment of the optical service channel in the incoming communication path.

9. A communication path impairment detection module as defined in claim 1, wherein a first optic fiber establishes the outgoing communication path and a second optic fiber establishes the incoming communication path.

10. A communication path impairment detection module as defined in claim 1, wherein an optic fiber establishes the outgoing communication path and the incoming communication path.

11. An optical amplifier including a communication path impairment detection module as defined in claim 1.

12. A method for detecting impairment in a duplex optic communication link, the duplex optic communication link including an outgoing communication path and an incoming communication path, each communication path being characterized by a data channel and an optical service channel, said method comprising:
   a) detecting impairment of the data channel and of the optical service channel in the incoming communication path;
   b) impairing the data channel in the outdoing communication channel;
   c) transmitting a control data element indicative of a non-impairment status in the optical service channel in the outgoing communication path when the impairment of the optical service channel in the incoming communication path is of a first impairment type; and
   d) transmitting a control data element indicative of an impairment status over the optical service channel in the outgoing communication path when the impairment of the optical service channel in the incoming communication path is of a second impairment type, the second impairment type being different from the first impairment type.

13. A method as defined in claim 12, wherein impairment of the data channel in the incoming communication path is characterized by either one of a low light intensity and an absence of light in the data channel.

14. A method as defined in claim 13, wherein impairing the data channel in the outgoing communication path is characterized by the transmission of either one of a low light intensity and an absence of light in the data channel in the outgoing communication path.

15. A method as defined in claim 13, wherein when impairment of the optical service channel in the incoming communication channel is of a second impairment type, impairment of the optical service channel in the incoming communication path is characterized by either one of a low light intensity arid an absence of light in the optical service channel.

16. A method as defined in claim 13, wherein when impairment of the optical service channel in the incoming communication channel is of a first impairment type, impairment of the optical service channel in the incoming communication path is characterized by a presence of a control data element of the optical service channel in the incoming communication path conveying an impairment status associated to the optical service channel in the outgoing communication path.

17. A method as defined in claim 13, wherein said method further comprises:
   i. deriving an optical power indicator indicative of an optical power condition associated to the data channel in the incoming communication path;
   ii. deriving an optical service channel indicator indicative of an optical service channel condition associated to the optical service channel in the incoming communication path;
   iii disabling transmission over the data channel of the outgoing communication path when the optical service channel indicator and the optical power condition indicator are indicative of impairment of the data channel and impairment of he optical service channel in the incoming communication path.

18. A method as defined in claim 12, wherein said method further comprises reestablishing transmission over the data channel in the outgoing communication path that was previously impaired when absence is detected of either one of impairment of the data channel and impairment of the optical service channel in the incoming communication path.

19. A method as defined in claim 12, wherein said method further comprises:
   i. monitoring the incoming communication path to detect impairment of the data channel
   ii. monitoring the incoming communication path to detect impairment of the optical service channel;

iii. disabling transmission over the data channel of the outgoing communication path when impairment of the optical service channel and of the data channel in the incoming communication path is detected.

20. A communication system comprising:
a) a duplex optic communication link having a first end and a second end, the duplex optic communication link including a first communication path and a second communication path each characterized by a data channel and an optical service channel;
b) a first communication path impairment detection module for connection to the second end of the duplex optic communication link, in operation the first communication path impairment detection module being downstream from the first communication path and upstream from the second communication path, said first communication path impairment detection module being characterized bay;
   i. a first port suitable for communication with the first communication path;
   ii. a second port suitable for communication with the second communication path;
   iii. a processing unit in communication with said first port and said second port, said processing unit being responsive to impairment of the data channel and of the optical service channel in the first communication path to:
      (a) impair the data channel in the second communication path; and
      (b) transmit a control data element indicative of a non-impairment status in the optical service channel in the second communication path when the impairment of the optical service channel in the first communication path is of a first impairment type; and
      (c) transmit a control data element indicative of an impairment status over the optical service channel in the second communication path when the impairment of the optical service channel in the first communication path is of a second impairment type, the second impairment type being different from the first impairment type.

21. A communication system as defined in claim 20, wherein said communication system further comprises:
a) a second communication path impairment detection module for connection to the first end of the duplex optic communication link, in operation the second communication path impairment detection module being upstream from the first communication path and downstream from the second communication path, said second communication path impairment detection module being characterized by:
   i. a first port suitable for communicating with the first communication path;
   ii. a second port suitable for communication with the second communication path;
   iii. a processing unit in communication with said first port and to said second port, said processing unit being responsive to impairment of the data channel and of the optical service channel of the second communication path to impair the data channel and the optical service channel in the first communication path.

22. A communication system as defined in claim 21, wherein impairment of the data channel in either one of the first and second communication paths is characterized by either one of a low light intensity and an absence of light in the data channel.

23. A communication system as defined in claim 22, wherein when impairment of the optical service channel in the first communication path is of a second impairment type, impairment of the optical service channel in the first communication path is characterized by either one of a low light intensity and an absence of light in the optical service channel.

24. A communication system as defined in claim 22, wherein when impairment of the optical service channel in the first communication path is of a first impairment type, impairment of the optical service channel in the first communication path is characterized by a presence of a control data element conveying an impairment status.

25. A communication path impairment detection module for connection to a duplex optic communication link, the duplex optic communication link including an outgoing communication path and an incoming communication path, each communication path being characterized by a data channel and an optical service channel, said communication path impairment detection module comprising:
a) first coupling means for coupling to the incoming communication path;
b) second coupling means for coupling to the outgoing communication path;
c) processing means responsive to impairment of the data channel and of the optical service channel in the incoming communication path for:
   i impairing the data channel in the outgoing communication path; and
   ii. transmitting a control data element indicative of a non-impairment status in the optical service channel in the outgoing communication path when the impairment of the optical service channel in the incoming communication path is of a first impairment type; and
   iii. transmitting a control data element indicative of an impairment status over the optical service channel in the outgoing communication path when the impairment of the optical service channel in the incoming communication path is of a second impairment type, the second impairment type being different from the first impairment type.

* * * * *

UNITED STATES PATENT AND TRADEMARK OFFICE
CERTIFICATE OF CORRECTION

PATENT NO.   : 6,810,210 B1
DATED        : October 26, 2004
INVENTOR(S)  : Marc Veilleux It is certified that error appears in the above-identified patent and that said Letters Patent is hereby corrected as shown below:

Column 12,
Line 43, "pot" should read -- port --;
Line 58, "serve" should read -- service --;
Line 59, the initial "I" in the word "Impairment" should not be capitalized;

Column 13,
Line 30, the coma between "incoming" and "communication" should be removed;

Column 14,
Line 1 "outdoing" should read -- outgoing --;
Line 29, "arid" should read -- and --;
Line 53, "he" should read -- the --;

Column 15,
Line 18, "bay" should read -- by --;

Column 16,
Line 41, there is a missing dot (.) after the enumerting "i".

Signed and Sealed this

Twenty-sixth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,810,210 B1
DATED : October 26, 2004
INVENTOR(S) : Marc Veilleux

It is certified that error appears in the above-identified patent and that said Letters Patent is hereby corrected as shown below:

Column 1,
Line 67, insert:
-- A deficiency in the use of optical reflectometer tools is that their performances is significantly affected by the location of the cut or pull in the optic fiber as well as by the power of the optical amplifier with which they are associated. --.

Signed and Sealed this

Twenty-fifth Day of October, 2005

JON W. DUDAS
*Director of the United States Patent and Trademark Office*